(12) United States Patent
Bachar et al.

(10) Patent No.: US 10,241,928 B2
(45) Date of Patent: *Mar. 26, 2019

(54) MAINTAINING CACHE CONSISTENCY IN A CACHE FOR CACHE EVICTION POLICIES SUPPORTING DEPENDENCIES

(71) Applicant: INTERNATIONAL BUSINESS MACHINES CORPORATION, Armonk, NY (US)

(72) Inventors: Yariv Bachar, Kibbutz Ma'abarot (IL); Aviv Kuvent, Raanana (IL); Asaf Levy, Rishon Le-Zion (IL); Konstantin Muradov, Tel Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/809,015

(22) Filed: Nov. 10, 2017

(65) Prior Publication Data

US 2018/0095896 A1    Apr. 5, 2018

Related U.S. Application Data

(63) Continuation of application No. 13/855,897, filed on Apr. 3, 2013, now Pat. No. 9,836,413.

(51) Int. Cl.
| | |
|---|---|
| *G06F 9/45* | (2006.01) |
| *G06F 12/08* | (2016.01) |
| *G06F 12/0808* | (2016.01) |
| *G06F 12/0815* | (2016.01) |
| *G06F 12/123* | (2016.01) |
| *G06F 12/0871* | (2016.01) |

(52) U.S. Cl.
CPC ........ *G06F 12/123* (2013.01); *G06F 12/0871* (2013.01); *G06F 2212/1016* (2013.01); *G06F 2212/312* (2013.01)

(58) Field of Classification Search
CPC ............. G06F 12/0842; G06F 12/0811; G06F 12/0866; G06F 12/121; G06F 12/0815; G06F 12/084; G06F 9/064; G06F 9/3004
USPC ........................................................ 711/133
See application file for complete search history.

(56) References Cited

U.S. PATENT DOCUMENTS

| | | | | |
|---|---|---|---|---|
| 5,870,763 | A | * | 2/1999 | Lomet ................. G06F 11/1438 |
| 6,141,731 | A | * | 10/2000 | Beardsley ............ G06F 12/127 |
| | | | | 711/133 |

(Continued)

OTHER PUBLICATIONS

Challenger et al., "A Scalable System for Consistently Caching Dynamic Web Data," IBM Research, T.J. Watson Research Center, IEEE, 1999 (10 pages).

*Primary Examiner* — Mohamed M Gebril
(74) *Attorney, Agent, or Firm* — Griffiths & Seaton PLLC

(57) ABSTRACT

For maintaining consistency for a cache that contains dependent objects in a computing environment, object dependencies for cached objects are managed by defining and maintaining object dependency lists for each one of the cached objects for identifying objects upon which the cached objects are dependent. Maintaining cache consistency for 2 types of cache eviction policies is supported by maintaining an object dependency lists for each one of the cached objects for identifying objects dependent upon the cached object. Each of the objects in an object dependency list is updated when the object is updated.

15 Claims, 6 Drawing Sheets

(56) References Cited

U.S. PATENT DOCUMENTS

| | | | | |
|---|---|---|---|---|
| 6,216,212 B1* | 4/2001 | Challenger | ....... | G06F 17/30902 707/999.008 |
| 6,782,410 B1* | 8/2004 | Bhagat | ................ | G06F 9/5027 709/201 |
| 6,842,377 B2* | 1/2005 | Takano | ................ | G11C 7/1021 365/185.21 |
| 7,017,011 B2* | 3/2006 | Lesmanne | ............ | G06F 12/082 711/141 |
| 7,196,942 B2* | 3/2007 | Khurana | ............ | G11C 7/1051 326/38 |
| 7,269,715 B2* | 9/2007 | Le | ........................ | G06F 9/3802 712/215 |
| 7,321,955 B2* | 1/2008 | Ohmura | ............. | G06F 12/0804 711/113 |
| 7,512,736 B1* | 3/2009 | Overby | ................ | G06F 3/0607 707/999.202 |
| 7,831,771 B2 | 11/2010 | Degenaro et al. | | |
| 8,230,193 B2* | 7/2012 | Klemm | ................ | G06F 3/0608 711/114 |
| 13,230,193 | 7/2012 | Klemm et al. | | |
| 8,566,546 B1* | 10/2013 | Marshak | .............. | G06F 3/0604 711/112 |
| 8,990,527 B1* | 3/2015 | Linstead | ............... | G06F 3/0617 711/161 |
| 2004/0068621 A1* | 4/2004 | Van Doren | ......... | G06F 12/0828 711/144 |
| 2005/0125607 A1* | 6/2005 | Chefalas | ............ | G06F 12/0862 711/113 |
| 2005/0192922 A1 | 9/2005 | Edlund et al. | | |
| 2006/0202999 A1* | 9/2006 | Thornton | .............. | G06F 12/145 345/531 |
| 2007/0008328 A1* | 1/2007 | MacWilliams | ..... | G06F 12/0646 345/530 |
| 2009/0094413 A1* | 4/2009 | Lehr | ..................... | G06F 3/0605 711/112 |
| 2009/0228648 A1* | 9/2009 | Wack | ................... | G06F 11/1092 711/114 |
| 2009/0282101 A1* | 11/2009 | Lim | ....................... | G06F 9/5077 709/203 |
| 2010/0046267 A1* | 2/2010 | Yan | ........................ | G11C 16/24 365/51 |
| 2010/0050016 A1* | 2/2010 | Franklin | ............. | G06F 11/0727 714/6.32 |
| 2010/0125712 A1* | 5/2010 | Murase | ............... | G06F 11/1458 711/162 |
| 2010/0241785 A1* | 9/2010 | Chen | .................... | G06F 9/5016 711/6 |
| 2010/0332780 A1* | 12/2010 | Furuya | ................. | G06F 3/0689 711/162 |
| 2011/0202735 A1* | 8/2011 | Kono | ................... | G06F 11/1451 711/162 |
| 2011/0307745 A1* | 12/2011 | McCune | ........... | G06F 17/30221 714/54 |
| 2012/0110293 A1* | 5/2012 | Yang | ................... | G06F 9/45558 711/170 |
| 2012/0198107 A1* | 8/2012 | McKean | ................. | G06F 13/18 710/40 |
| 2013/0007373 A1* | 1/2013 | Beckmann | ............ | G06F 12/126 711/136 |
| 2013/0067161 A1* | 3/2013 | Chandra | ............. | G06F 13/12 711/114 |
| 2013/0080805 A1* | 3/2013 | Vick | ..................... | G06F 8/4432 713/320 |
| 2013/0111129 A1* | 5/2013 | Maki | .................... | G06F 3/0611 711/117 |
| 2013/0152097 A1* | 6/2013 | Boctor | ................... | G06F 9/505 718/103 |
| 2013/0159631 A1* | 6/2013 | Seufert | ............... | G06F 17/3048 711/141 |
| 2013/0326270 A1* | 12/2013 | Chen | ................... | G06F 11/2089 714/6.21 |
| 2014/0003114 A1* | 1/2014 | Pellizzer | ............. | H01L 27/2481 365/63 |

* cited by examiner

MAINTAINING CACHE CONSISTENCY IN A CACHE FOR CACHE EVICTION POLICIES SUPPORTING DEPENDENCIES

CROSS REFERENCE TO RELATED APPLICATIONS

This Application is a Continuation of U.S. patent application Ser. No. 13/855,897, filed on Apr. 3, 2013.

BACKGROUND OF THE INVENTION

Field of the Invention

The present invention relates in general to computers, and more particularly to maintaining cache consistency for cache eviction policies that support dependency between cached objects in a computing environment.

Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically require a large amount of data storage. Customer data, or data generated by users within the data processing system, occupies a great portion of this data storage. Many of these computer systems include virtual storage components. One of the many challenges of these computing system is storing, placing, and arranging data files in such a way that allows for quick and timely access to the files.

SUMMARY OF THE DESCRIBED EMBODIMENTS

In one embodiment, a method is provided for maintaining consistency in a cache which contains objects that depend on each other using a processor device. For maintaining consistency for a cache that contains dependent objects in a computing environment, object dependencies for the cached objects are managed by defining and maintaining object dependency lists for each one of the cached objects for identifying objects upon which the cached objects are dependent. The method supports maintaining cache consistency for 2 types of cache eviction policies by maintaining an object dependency lists for each one of the cached objects for identifying objects dependent upon the cached object. Each of the object dependency lists for a new object is built prior to the new object being added to the cache such that the objects in the each one of the object dependency lists are updated in order to ensure that the addition of the new object to the cache will not cause a removal of an object in a previous one of the object dependency lists upon which the new object depends.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
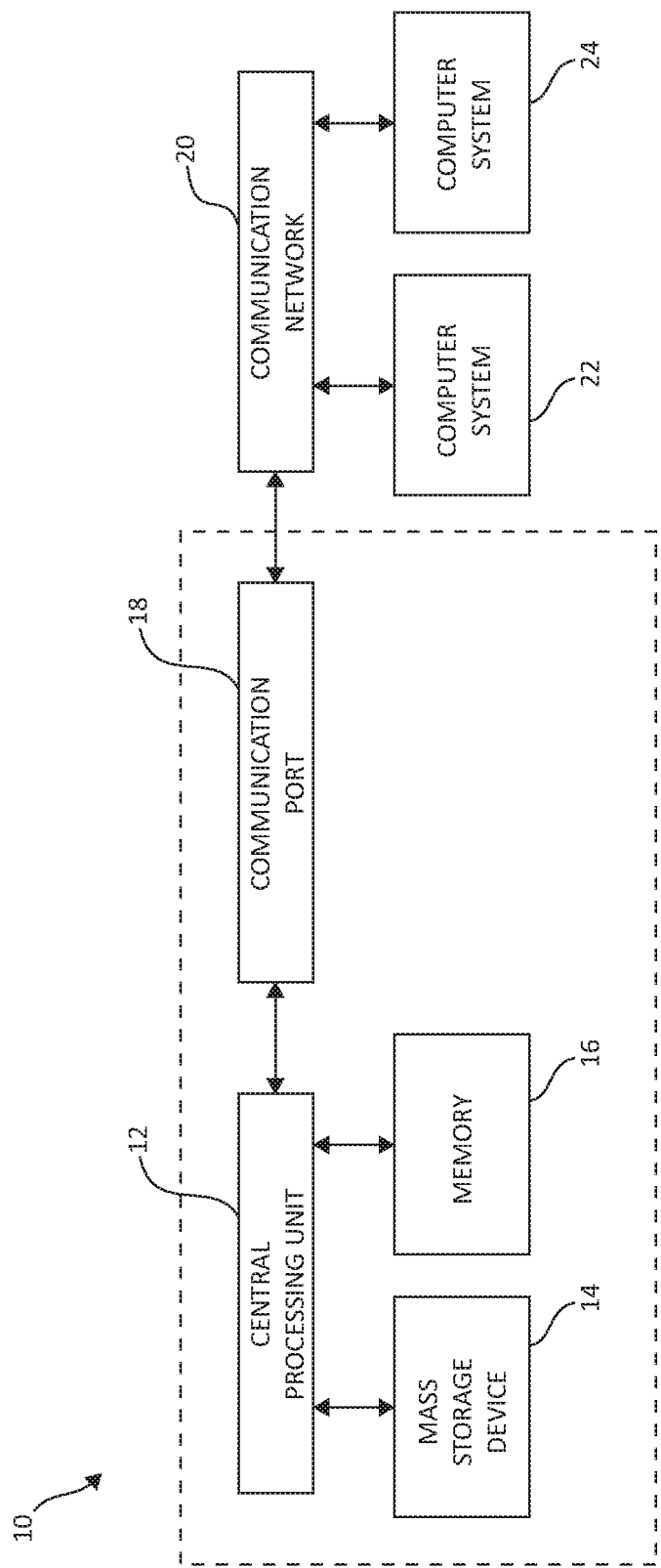
FIG. 1 is a block diagram illustrating a computer storage environment having an exemplary storage device in which aspects of the present invention may be realized.

As previously mentioned, computing systems are used to store and manage a variety of types of data and/or files. One of the many challenges of these computing system is storing, placing, and arranging data files in such a way that allows quick and timely access to the files. In one embodiment, for computer applications dealing with a group of data objects, a cache is maintained on a sub-group of these objects. Using a cache allows faster access to the objects for computing applications having a high interest in the objects. In order to maintain a cache of a size smaller than the group of objects the cache refers to, an eviction policy may be required. Eviction policies such as Least Recently Used (LRU), Most Recently Used (MRU) and the like, may track the objects access pattern in order to decide which objects should remain in the cache and which objects should be evicted from the cache. In one embodiment, there may be a dependency between the objects in the cache such that an object may not be evicted from the cache before other objects are evicted. For example, a tree cache may require that all of the children of a tree node will be removed before the node itself may be removed.

Thus, since traditional eviction policies do not handle dependencies between objects in the cache, the present invention provides a solution to address this issue and deals with such cases. In one embodiment, the present invention defines the following essential requirements for efficiently maintaining the consistency of a cache containing objects dependent on each other. First, the present invention ensures cache consistency (i.e. objects are not evicted from the cache before objects that depend on them), and second, maintaining a cache object dependency should not add more than K operations to an update procedure, where K is defined as the number of objects that depends on the updated object. For example, if A depends on C and B depends on C and so on the number of update operations resulting from the update of the initial object A should not be larger than the number of objects which A (recursively) depends on.

In one embodiment, the present invention maintains consistency in a cache which contains objects that depend on each other using a processor device. For maintaining consistency for a cache that contains dependent objects in a computing environment, object dependencies for the cached objects are managed by defining and maintaining object dependency lists for each one of the cached objects for identifying objects upon which the cached objects are dependent. The present invention supports maintaining cache consistency for 2 types of cache eviction policies by maintaining an object dependency lists for each one of the cached objects for identifying objects dependent upon the cached object. Each of the objects in an object dependency list is updated when the object is updated.

In one embodiment, generally, the cache consistency may refer to the consistency of data of a computing environment (e.g., caches of a shared resource). A cache is consistent if for each object in the cache all of the objects it depends on are present in the cache. The present invention provides a solution to preserve this state. More specifically, the cache consistency may refer to maintaining consistency for a subgroup of a group of data objects stored in caches. In other words, cache consistency is maintained when objects are not evicted from the cache before objects that depend on the objects (e.g., an object may not be evicted from the cache before other objects are evicted based upon a dependency relationship).

Thus the present invention maintains cache consistency for cached objects while supporting several types of cache eviction policies where the eviction policies determine which objects should remain in the cache and which objects should be evicted from the cache for maintaining a required size in the cache. The present invention supports a dependency relationship between cached objects and other objects and allows for managing a dependency in a group of cached objects. In one embodiment, the present invention relates to 2 types of cache eviction policies (e.g., cache eviction policy algorithms). In one embodiment, 2 types of cache eviction policies may be used. Type I algorithms, such as Least Recently Used (LRU) and Least Frequently Used (LFU) that evict the rarely used/oldest objects. Type II algorithms such as Most Recently Used (MRU) that evict the commonly used/newest objects. These eviction policies track the objects access pattern in order to decide which objects should remain in the cache and which objects should be evicted from the cache.

Since there may be a dependency between the objects in the cache such that an object may not be evicted from the cache before other objects are evicted, the present invention provides a solution for identifying objects upon which the cached objects are dependent using object dependency lists. As such, in one embodiment, object dependencies for the cached objects are managed by defining and maintaining the object dependency lists for each one of the cached objects.

For type I algorithms, the present invention defines per each object in the cache, a list of the objects the cached object depends on. Similarly, for type II algorithms, the present invention defines per each object in the cache, a list of the objects that depend on the cached object. In this way, the present invention maintains the cache consistency without adding significant computation overhead to the normal operation of the cache.

Turning now to FIG. 1, exemplary architecture 10 of data storage systems in a computing environment is depicted. The computer system 10 includes central processing unit (CPU) 12, which is connected to mass storage device(s) 14 and memory device 16. Mass storage devices can include hard disk drive (HDD) devices, solid-state devices (SSD) etc., which can be configured in a redundant array of independent disks (RAID). The backup operations further described can be executed on device(s) 14, located in system 10 or elsewhere. Memory device 16 can include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24.

Figure 2:
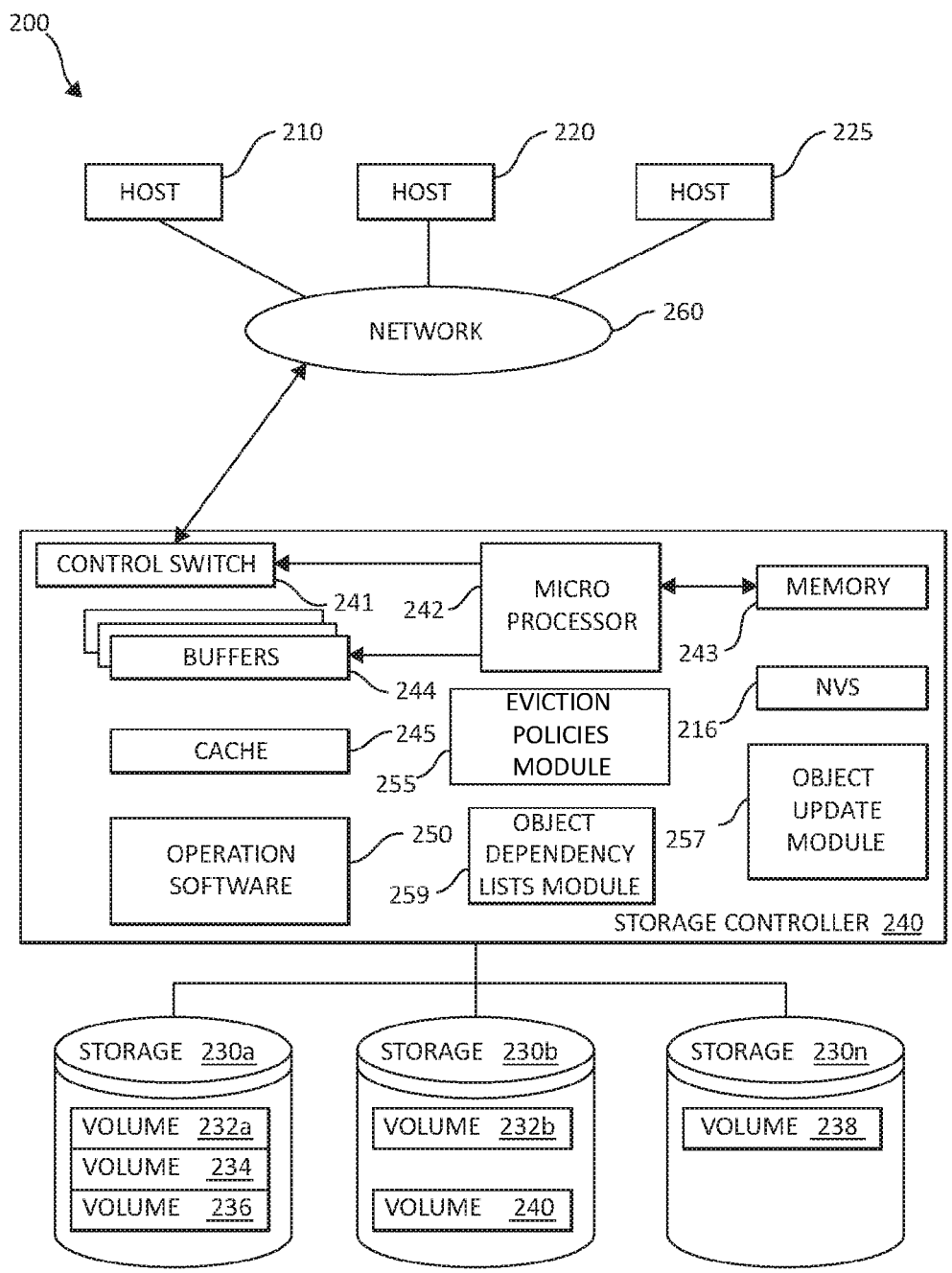
FIG. 2 is a block diagram illustrating a hardware structure of an exemplary data storage system in a computer system in which aspects of the present invention may be realized.

FIG. 2 is an exemplary block diagram 200 showing a hardware structure of a data storage system in a computer system according to the present invention. Referring to FIG. 2, there are shown host computers 210, 220, 225, each acting as a central processing unit for performing data processing a part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 1 comprising storage controller 240 and storage 230.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps associated with managing storage 230 and executing the steps and methods of the present invention in a computer storage environment. In one embodiment, system memory 243 includes, is associated, or is in communication with the operation software 250 in a computer storage environment, including the methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the Cache 245 for any purposes suited to accomplish the objectives of the present invention. In some embodiments, a backup power source (not shown in FIG. 2), such a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include an eviction policies module 255, an object update module 257, and an object dependency list module 259 in a computer storage environment. The eviction policies module 255, the object update module 257, and the object dependency list module 259 may work in conjunction with each and every component of the storage controller 240, the hosts 210, 220, 225, and storage devices 230. The eviction policies module 255, the object update module 257, and the object dependency list module 259 may be structurally one complete module working together and in conjunction with each other for performing such functionality as described below, or may be individual modules. The eviction policies module 255, the object update module 257, and the object dependency list module 259 may also be located in the cache 245 or other components of the storage controller 240 to accomplish the purposes of the present invention.

The storage controller 240 may be constructed with a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, the eviction policies module 255, the object update module 257, and the object dependency list module 259 on which information may be set. Multiple buffers 244 may be implemented with the present invention in a computing environment, or performing other functionality in accordance with the mechanisms of the illustrated embodiments.

In one embodiment, by way of example only, the host computers or one or more physical or virtual devices, 210, 220, 225 and the storage controller 240 are connected through a network adaptor (this could be a fiber channel) 260 as an interface i.e., via a switch sometimes referred to as "fabric." In one embodiment, by way of example only, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, the eviction policies module 255, the object update module 257, and the object dependency list module 259 are in communication with each other and may be separate or one individual component(s). Also, several, if not all of the components, such as the operation software 245 may be included with the memory 243 in a computer storage environment. Each of the components within the storage device may be linked together and may be in communication with each other for purposes suited to the present invention.

In one embodiment, the present invention provides a solution for maintaining consistency in a cache which contains objects that depend on each other in which aspects of the present invention may be realized is depicted. For maintaining consistency in a cache which contains objects that depend on each other a cache which contains dependent objects in a computing environment, object dependencies for the cached objects are managed by defining and maintaining object dependency lists for each one of the cached objects for identifying objects upon which the cached objects are dependent. The present invention defines and maintains object dependency lists for each one of the cached objects for identifying objects upon which the cached objects are dependent according to a type I eviction policy. The present invention defines and maintains object dependency lists for each one of the cached objects for identifying objects dependent upon the cached objects according to a type II eviction policy. The present invention updates each of the object dependency lists when an object is updated. The present invention performs cache updates in a manner that keeps the cache consistent according to the eviction policy.

Figure 3:
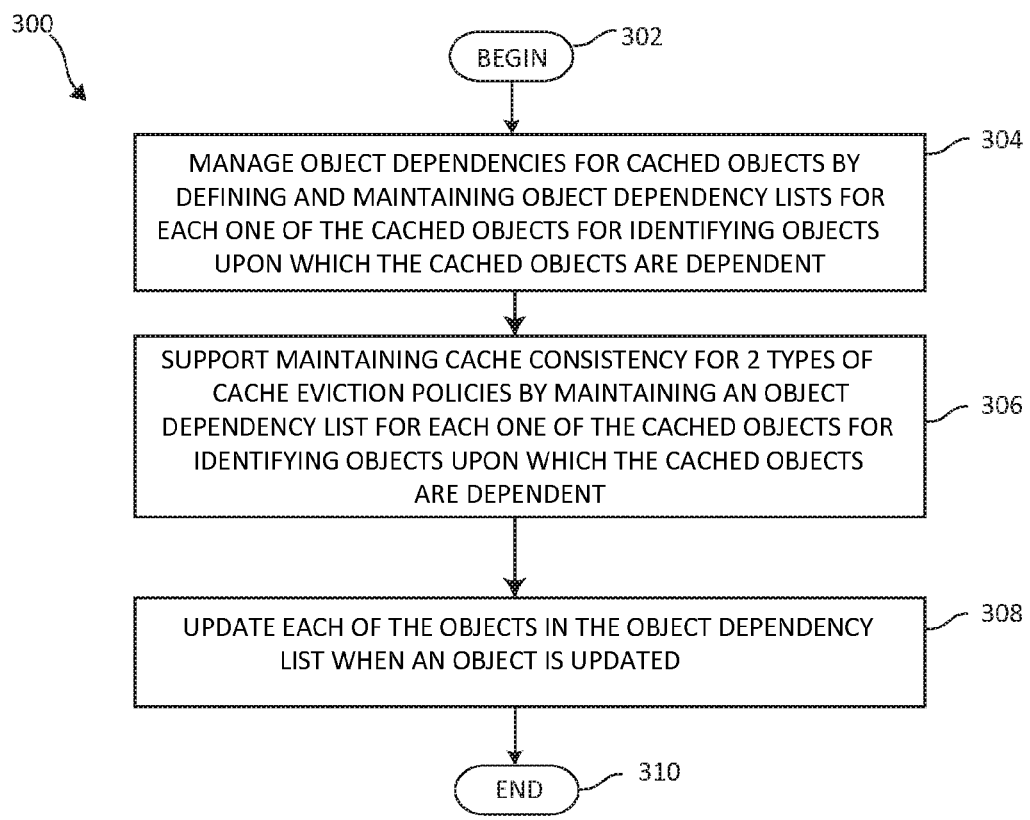
FIG. 3 is a flow chart diagram illustrating an exemplary method for maintaining consistency in a cache which contains objects that depend on each other in which aspects of the present invention may be realized.

Turning now to FIG. 3, a flow chart diagram illustrating an exemplary method 300 for maintaining consistency in a cache which contains objects that depend on each other in which aspects of the present invention may be realized is depicted. The method 300 begins (step 302) by managing object dependencies for the cached objects by defining and maintaining object dependency lists for each one of the cached objects for identifying objects upon which the cached objects are dependent (step 304). The method 300 supports maintaining cache consistency for 2 types of cache eviction policies by maintaining an object dependency lists for each one of the cached objects for identifying objects dependent upon the cached object (step 306). Each of the objects in an object dependency list is updated when the object is updated (step 308). The method 300 ends (step 310).

Thus, the present invention maintains cache consistency for cached objects using cache eviction policies, which evict some of the cached objects to maintain a required size in the cache, that support a dependency between cached objects and other objects. In one embodiment, the present invention relates to the 2 types of cache eviction algorithms. A type I eviction policy may be considered Type I algorithms such as LRU and LFU that evict the rarely used/oldest objects. A type II eviction policy may be considered Type II algorithms such as MRU that evict the commonly used/newest objects. In this way, the present invention manages a dependency in a group of cached objects thereby maintains the cache consistency without adding significant computation overhead to the normal operation of the cache For the type I eviction policy, the present invention defines per each object in the cache, a list of the objects the cached objects depends on. Similarly, for the type II eviction policy, the present invention defines per each object in the cache, a list of the objects that depend on the cached objects. In order to ensure the cache consistency is maintained following an object update, all the objects in that specific object's object dependency list are updated as well. The updates are transitive, meaning that if object A refers to object B, and object B refers to object C, an update on object A will trigger an update on both B and C. So updating an object that has K other objects depends on it (e.g., the object), will require K operations (e.g., K updating operations).

Since the type I eviction policy (e.g., type I algorithms) evicts the LRU and LFU objects (e.g., oldest objects/the rarely used) first, and since an object that has another object depending on the object is always updated following that object's update, the cache consistency is maintained and ensured in the cache. The reason the cache consistency is ensured is that the dependent object will be considered as less up-to-date or frequently used than the object it (e.g., the dependent object) depends on.

In a similar manner, since the type II eviction policy (e.g., type II algorithms) evicts the commonly used/newest objects first, and since an update of an object that has another object depending on it will cause the dependent object to be updated, the cache consistency is maintained and ensured in the cache. The reason the cache consistency is ensured is that the dependent object will be considered as more up-to-date than the object it (e.g., the dependent object) depends on.

In one embodiment, prior to and/or before adding an object to a cache, the object dependency list is built and the objects in the object dependency list are updated in order to ensure that the addition of the new object will not cause the removal of an object it depends on. Also, it is required that an object will be added into the cache only after all of the objects that the soon to be cached object depends on are already in the cache. For example, consider the following tree structure, which is contained in a least recently used (LRU) cache that has space only for 4 objects, as depicted in FIG. 4.

Figure 4:
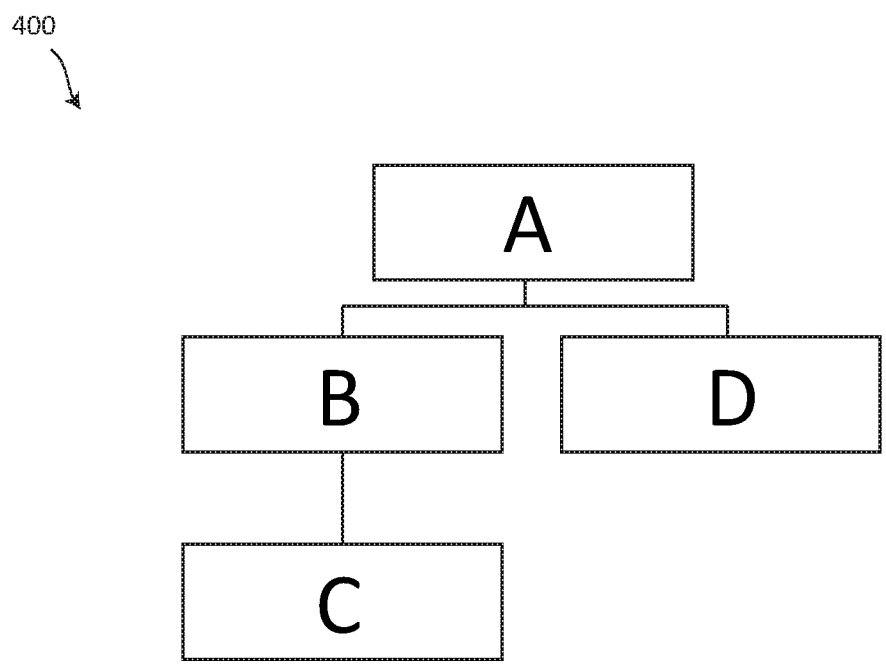
FIG. 4 is a block diagram illustrating an exemplary tree structure for maintaining cache consistency for cache eviction policies that supports dependency between cached objects in which aspects of the present invention may be realized.

Turning now to FIG. 4, a block diagram 400 illustrating an exemplary tree structure for maintaining cache consistency for cache eviction policies that supports dependency between cached objects in which aspects of the present invention may be realized is depicted. As illustrated in FIG. 4, the tree structure has 4 objects illustrated as A, B, C, and D. Using the present invention, as described herein, object C will keep a reference to object B, while object B and object D will each keep a reference to object A. An update to object C will trigger an update to object B, which in turn will trigger an update to object A. Following the update, the order in the cache from oldest to newest will be D, C, B, and A. Thus, as mentioned above, since the type I eviction policy (e.g., type I algorithms) evicts the LRU and/or LFU objects (e.g., oldest objects/the rarely used) first, and since an object that has another object depending on the object is always updated following that object's update, the cache consistency is maintained and ensured in the cache. The reason the cache consistency is ensured is that the dependent object will be considered as less up-to-date or less frequently used than the object it (e.g., the dependent object) depends on.

Figure 5:
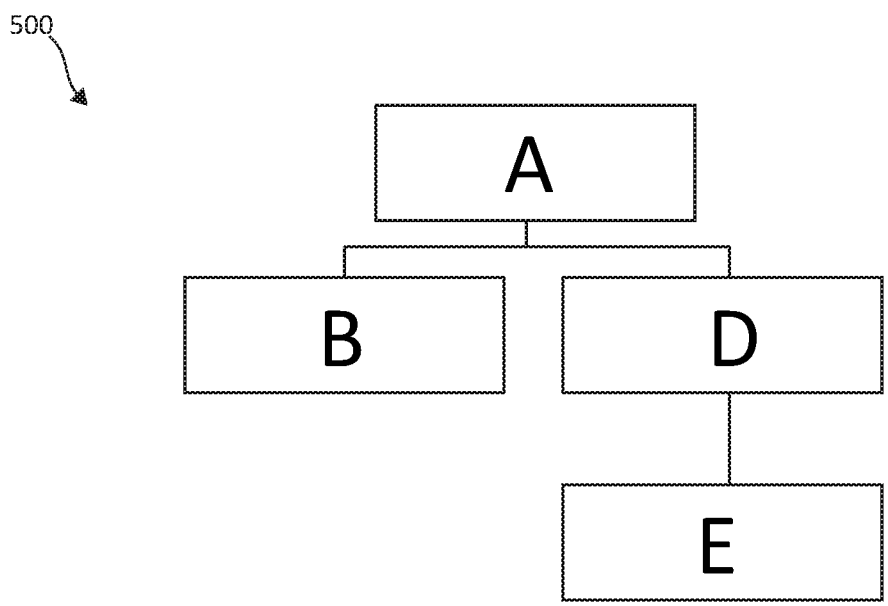
FIG. 5 is a block diagram illustrating an additional exemplary tree structure for maintaining cache consistency for cache eviction policies that supports dependency between cached objects in which aspects of the present invention may be realized.

Turning now to FIG. 5, a block diagram 500 illustrating an additional exemplary tree structure for maintaining cache consistency for cache eviction policies that supports dependency between cached objects is depicted. Continuing from FIG. 4, if it is desirable to add a new object to the cache (E) below D, first object D is updated since E depends on object D, which will trigger an update to object A as well. So at the moment of the addition of object E, the cache order will be C B E D A. Immediately after the addition of object E, object C will be evicted from the cache leading to the following structure that is depicted in FIG. 5. Thus, as illustrated in FIG. 5 the eviction policies track the objects access pattern in order to decide which objects should remain (e.g., object A, object B, object D) in the cache and which objects should be evicted (e.g., object C) from the cache.

As illustrated, dependencies existed between the objects in the cache such that object B and object D have a dependency relationship with object A and the newly added object E depends on object D. As such, in one embodiment, object dependencies for the cached objects are managed by defining and maintaining an object dependency lists for each one of the cached objects. The object dependency lists allow identifying objects upon which the cached objects are dependent according to the type I eviction policy. The object dependency lists also allow identifying objects, which depend upon the cached object. In order to ensure the cache consistency following an object update, all the objects in that objects dependency list are updated as well. As illustrated below, in FIG. 6, in order to ensure the cache consistency, each object maintains a list of references to the objects it depends on and/or a list of references to the objects, which depend on it according to the eviction algorithm type. In one embodiment, an operation of updating an object and its dependency list is performed in order to ensure the cache consistency. Current object is defined as the object that the update was requested for. The current object position in cache relative to the used cache eviction policy is updated. For each object in the current object dependency list, recursively perform the operation of updating an object and its dependency list (according to the eviction algorithm).

Figure 6:
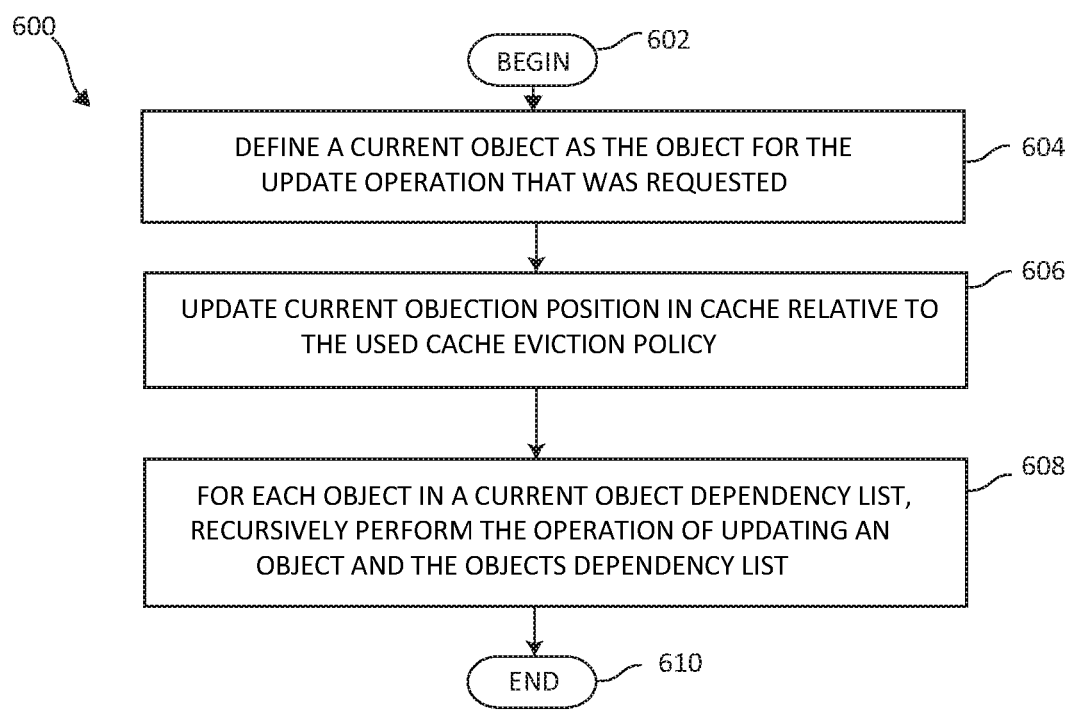
FIG. 6 is a flow chart diagram illustrating an additional exemplary method for updating an object and the objects dependency lists in order to ensure the cache consistency in which aspects of the present invention may be realized.

FIG. 6 is a flow chart diagram illustrating an additional exemplary method 600 for updating an object and the objects dependency list in order to ensure the cache consistency in which aspects of the present invention may be realized. The method 600 defines a current object as the object for an update operation that was request for the current object (step 604). The method 600 updates the current object position in cache relative to the used cache eviction policy (step 606). The method 600, for each object in a current object dependency list, recursively performs the operation of updating the object and the object dependency list (step 608). The method 600 ends (step 610).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for maintaining consistency in a cache which contains objects that depend on each other by a processor device in a computing environment, the method comprising:
   managing object dependencies for the cached objects by:
      defining and maintaining object dependency lists for each one of the cached objects for identifying additional objects within the cache upon which the cached objects are dependent according to a type I eviction policy, and
      defining and maintaining the object dependency lists for each one of the cached objects for identifying the additional objects within the cache dependent upon the cached objects according to a type II eviction policy, the type I eviction policy and the type II eviction policy used to preclude the cached objects from eviction from the cache prior to the additional objects from which the cached objects depend; and
      building one of the object dependency lists for a new object prior to the new object being added to the cache, wherein the objects in the one of the object dependency lists are updated in order to ensure that the addition of the new object to the cache will not cause a removal of an object in the one of the object dependency lists upon which the new object depends.

2. The method of claim 1, further including updating the object according to one of the type I eviction policy and the type II eviction policy.

3. The method of claim 2, further including adding the new object into the cache only after all of the objects upon which the new object depends are already located in the cache.

4. The method of claim 3, further including performing at least one of:
   defining a current object as one of the objects for which an update is requested,
   updating the current object position in the cache relative to the type I eviction policy, and
   updating the current object position in the cache relative to the type II eviction policy.

5. The method of claim 4, further including, for each one of the objects in the object dependency lists, recursively performing the operation of updating one of the objects and the one of the object dependency lists associated with the one of the objects.

6. A system for maintaining consistency in a cache which contains objects that depend on each other in a computing environment, the system comprising:
   the cache; and
   at least one processor device operable in the computing storage environment and in communication with the cache, wherein the at least one processor device:
      manages object dependencies for the cached objects by:
         defining and maintaining object dependency lists for each one of the cached objects for identifying additional objects within the cache upon which the cached objects are dependent according to a type I eviction policy, and
         defining and maintaining the object dependency lists for each one of the cached objects for identifying the additional objects within the cache dependent upon the cached objects according to a type II eviction policy, the type I eviction policy and the type II eviction policy used to preclude the cached objects from eviction from the cache prior to the additional objects from which the cached objects depend; and
      builds one of the object dependency lists for a new object prior to the new object being added to the cache, wherein the objects in the one of the object dependency lists are updated in order to ensure that the addition of the new object to the cache will not cause a removal of an object in the one of the object dependency lists upon which the new object depends.

7. The system of claim 6, wherein the at least one processor device updates the object according to one of the type I eviction policy and the type II eviction policy.

8. The system of claim 7, wherein the at least one processor device adds the new object into the cache only after all of the objects upon which the new object depends are already located in the cache.

9. The system of claim 8, wherein the at least one processor performs at least one of:
   defining a current object as one of the objects for which an update is requested,
   updating the current object position in the cache relative to the type I eviction policy, and
   updating the current object position in the cache relative to the type II eviction policy.

10. The system of claim 9, wherein the at least one processor device, for each one of the objects in the object dependency lists, recursively performs the operation of updating one of the objects and the one of the object dependency lists associated with the one of the objects.

11. A computer program product for maintaining consistency in a cache which contains objects that depend on each other in a computing environment by a processor device, the computer program product comprising a non-transitory computer-readable storage medium having computer-readable program code portions stored therein, the computer-readable program code portions comprising:
   an executable portion that manages object dependencies for the cached objects by:
      defining and maintaining object dependency lists for each one of the cached objects for identifying additional objects within the cache upon which the cached objects are dependent according to a type I eviction policy, and
      defining and maintaining the object dependency lists for each one of the cached objects for identifying additional objects within the cache dependent upon the cached objects according to a type II eviction policy, the type I eviction policy and the type II eviction policy used to preclude the cached objects from eviction from the cache prior to the additional objects from which the cached objects depend; and
   an executable portion that builds one of the object dependency lists for a new object prior to the new object being added to the cache, wherein the objects in the one of the object dependency lists are updated in order to ensure that the addition of the new object to the cache will not cause a removal of an object in the one of the object dependency lists upon which the new object depends.

12. The computer program product of claim 11, further including an executable portion that updates the object according to one of the type I eviction policy and the type II eviction policy.

13. The computer program product of claim 12, further including an executable portion that adds the new object into the cache only after all of the objects upon which the new object depends are already located in the cache.

14. The computer program product of claim 13, further including an executable portion that performs at least one of:
defining a current object as one of the objects for which an update is requested,
updating the current object position in the cache relative to the type I eviction policy, and
updating the current object position in the cache relative to the type II eviction policy.

15. The computer program product of claim 14, further including an executable portion that, for each one of the objects in the object dependency lists, recursively performs the operation of updating one of the objects and the one of the object dependency lists associated with the one of the objects.

\* \* \* \* \*